INVENTOR.
Ervin J. Osterhus
BY Harry R. Canfield
ATTORNEY

Aug. 16, 1949.                    E. J. OSTERHUS                    2,478,938
              PRESSURE AND VACUUM SUPPLYING APPARATUS FOR
              TESTING PRESSURE RESPONSIVE INSTRUMENTS
Filed Sept. 25, 1944                                   9 Sheets-Sheet 2

INVENTOR.
Ervin J. Osterhus
BY
ATTORNEY

Aug. 16, 1949.  E. J. OSTERHUS  2,478,938
PRESSURE AND VACUUM SUPPLYING APPARATUS FOR
TESTING PRESSURE RESPONSIVE INSTRUMENTS
Filed Sept. 25, 1944  9 Sheets-Sheet 3

INVENTOR.
Ervin J. Osterhus
BY Harry R. Canfield
ATTORNEY

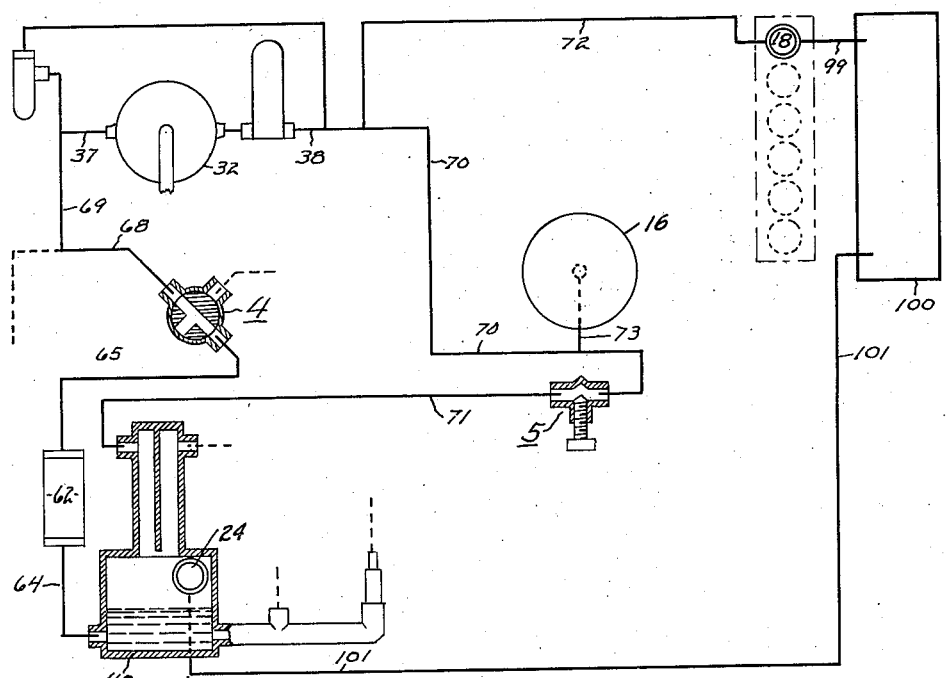

Aug. 16, 1949.  E. J. OSTERHUS  2,478,938
PRESSURE AND VACUUM SUPPLYING APPARATUS FOR
TESTING PRESSURE RESPONSIVE INSTRUMENTS
Filed Sept. 25, 1944  9 Sheets-Sheet 5

INVENTOR.
Ervin J. Osterhus
BY
ATTORNEY

Aug. 16, 1949.   E. J. OSTERHUS   2,478,938
PRESSURE AND VACUUM SUPPLYING APPARATUS FOR
TESTING PRESSURE RESPONSIVE INSTRUMENTS
Filed Sept. 25, 1944   9 Sheets-Sheet 6

INVENTOR.
Ervin J. Osterhus
BY Harry P. Canfield
ATTORNEY

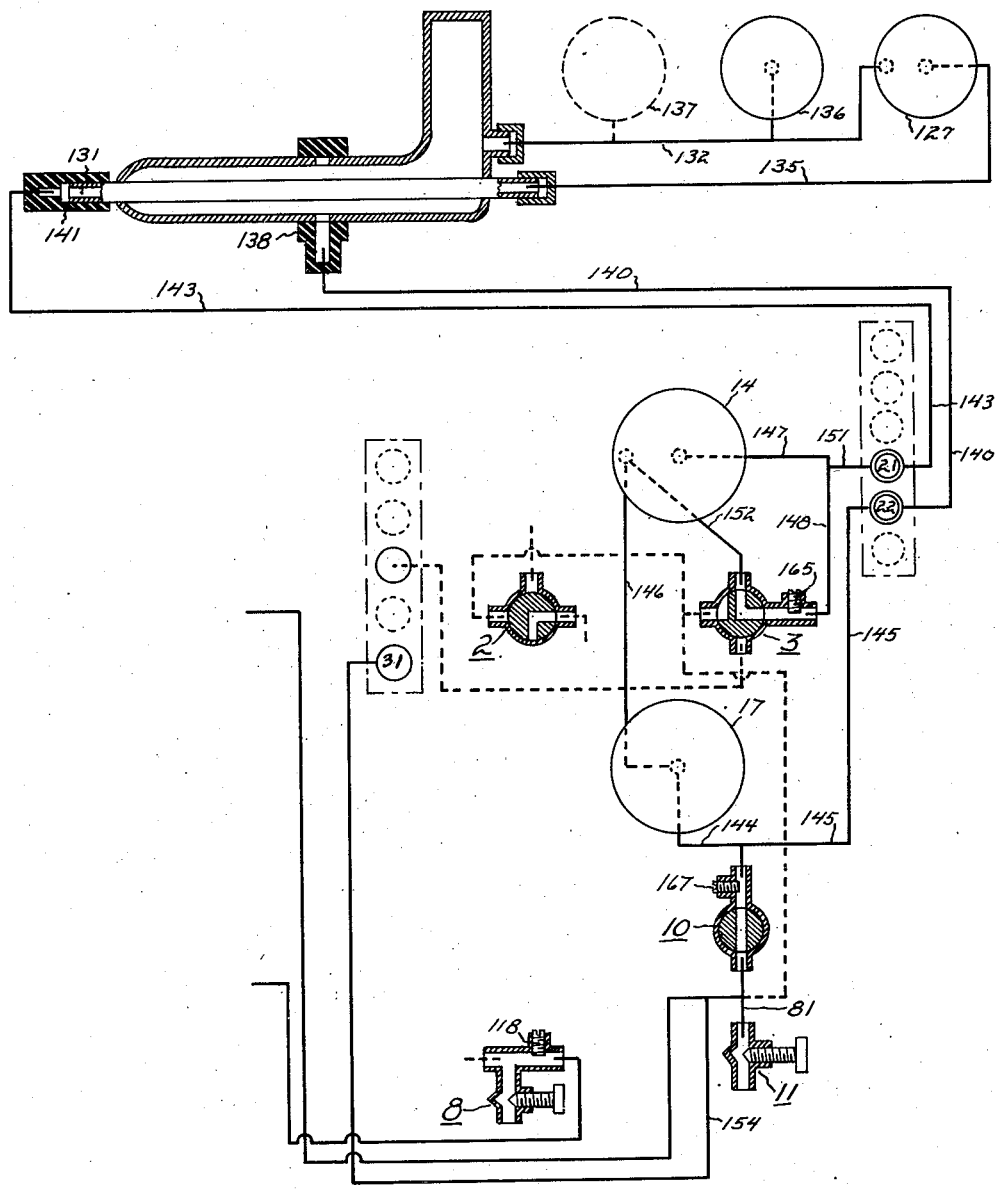

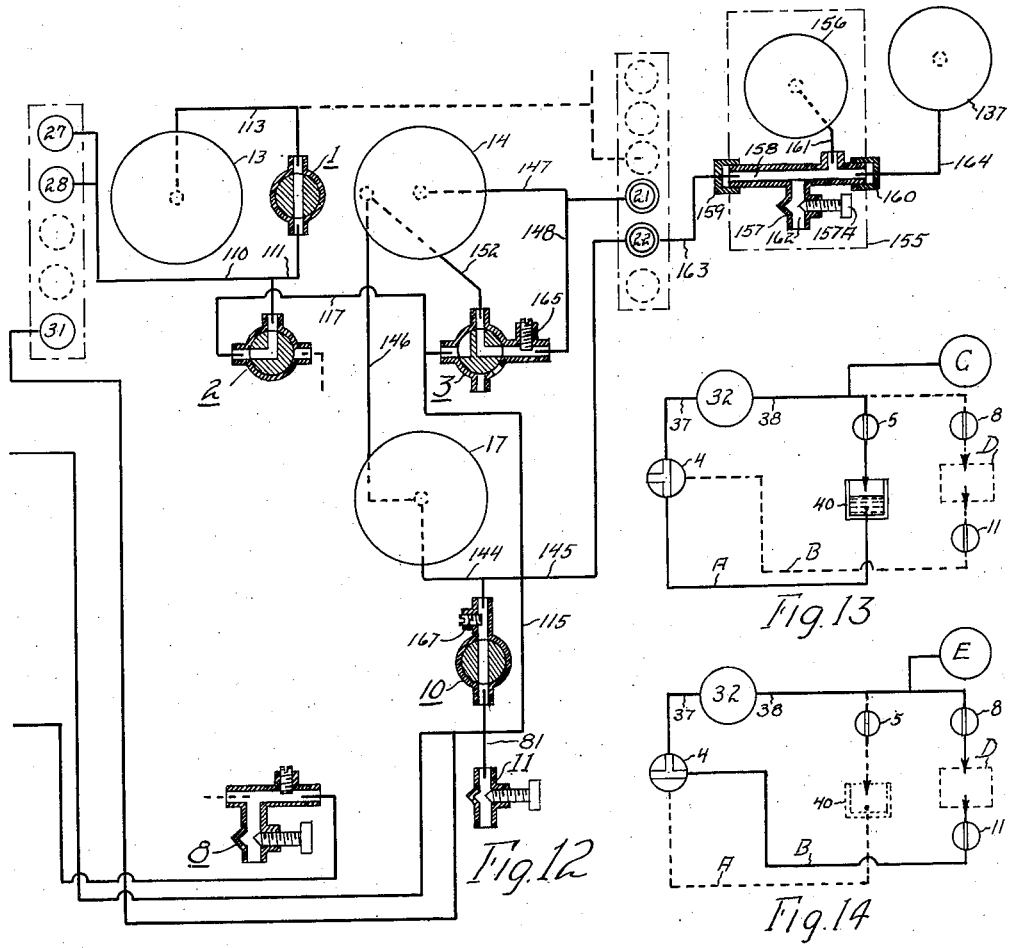
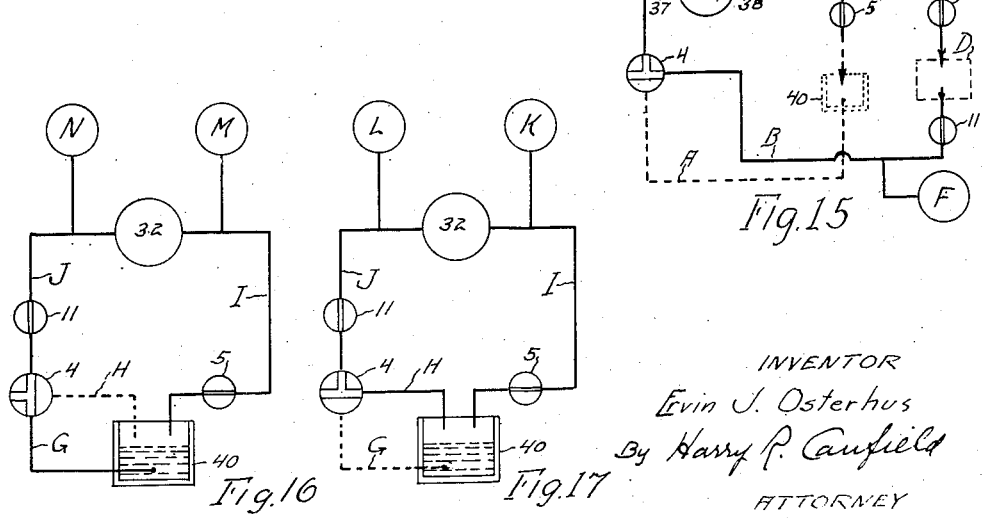

Patented Aug. 16, 1949

2,478,938

UNITED STATES PATENT OFFICE 2,478,938

PRESSURE AND VACUUM SUPPLYING APPARATUS FOR TESTING PRESSURE RESPONSIVE INSTRUMENTS

Ervin J. Osterhus, Cleveland, Ohio, assignor, by mesne assignments, of thirty one-hundredths to Ralph R. Roemer, thirty-five one-hundredths to Louise E. Roemer, twenty-five one-hundredths to William R. Kiefer, and ten one-hundredths to J. Everette Tompkins Application September 25, 1944, Serial No. 555,621

18 Claims. (Cl. 73—4)

This invention relates to apparatus for delivering, at a point of use, adjustably variable fluid pressure and vacuum.

The invention is particularly applicable to the supplying of fluid pressure and vacuum for testing the accuracy and reliability of various types of indicating instruments and auxiliary apparatus as used on aircraft and will be described herein as applied to that use, although as will become apparent hereinafter the invention may be applied to other uses.

The particular embodiment of the invention illustrated and described herein is therefore a testing apparatus; and comprises, among other things, a rotary pump of a type which can pump either air, or liquids such as oil; and conduit outlets to which apparatus to be tested may be connected to the testing apparatus; and conduits, and valves controlling them by which the pump is caused to supply to the conduit outlets, oil under pressure, air under pressure, and air vacuum, selectively, and each adjustably variable; and certain indicating reference or master instruments, which are known to be accurate, by which the supplied pressure and vacuum can be indicated and with which the indications of instruments being tested can be compared.

The primary object therefore is to provide an improved testing apparatus of the class referred to above.

Another object is to provide such a testing apparatus which can be used to test one or more of the following types of aircraft apparatus in the ranges of performance given therefor;

Vacuum operated instruments such as altimeters to a maximum of 50,000 feet of altitude; and air speed indicators from zero to 700 miles per hour and engine manifold pressure gages, suction gages, rate of climb indicators, etc., to a maximum of 26½ inches of mercury vacuum;

Air pressure operated instruments such as fuel pressure gages, engine manifold pressure gages, de-icer pressure gages, etc., up to 25 pounds per square inch pressure;

Oil pressure operated instruments such as engine oil pressure gages, etc., up to 300 pounds per square inch pressure;

Oil operated apparatus (for example the servo-motor of an automatic pilot) etc., which is to be tested by the circulation of oil therethrough under pressure, up to 2 gallons per minute at 300 pounds per square inch pressure.

Another object is to provide a testing apparatus comprising among other features a pump having an inlet conduit and an output conduit; a selector valve to cause the pump to deliver oil and air to the output conduit, selectively; an oil conduit by-pass from the output to the inlet conduit when the pump is pumping oil; a by-pass from the output conduit through the atmosphere to the inlet conduit when the pump is pumping air; and valves to throttle the by-passes to cause the pump to deliver to conduit service couplings, oil under pressure, air under pressure, and vacuum, selectively.

Another object is to provide a testing apparatus comprising an improved accessory device for supplying variably adjustable high oil testing pressure at a point adjacent to a pressure gage or other apparatus on an aircraft.

Another object is to provide a testing apparatus comprising an improved accessory device for supplying variable testing vacuum at a point adjacent to a rate of climb indicator or other apparatus on an aircraft.

Another object is to provide an improved means and method for testing an aircraft altimeter for altitudes up to 50,000 feet or more, without disconnecting the altimeter or its associated air-speed indicator from the "static" conduit line on the aircraft to which they are conventionally both connected.

The invention is fully disclosed in the following description taken in connection with the accompanying drawing in which:

Figs. 5 and 6 are views similar to a part of Fig. 1 illustrating the parts thereof which function when the apparatus is delivering a volumetric flow of oil under pressure to two different kinds of apparatus corresponding to the two figures;

Fig. 11 is a view generally similar to Fig. 10 but illustrating the operation of the parts when delivering static vacuum to the altimeter of an aircraft which together with the air speed indicator is connected to the static conduit line of the Pitot-static head of the aircraft;

Fig. 12 is a view similar to a part of Fig. 1 illustrating the parts thereof which function when the apparatus is delivering static pressure, and in association with an accessory device for testing a rate of climb indicator of an aircraft;

Figure 1:
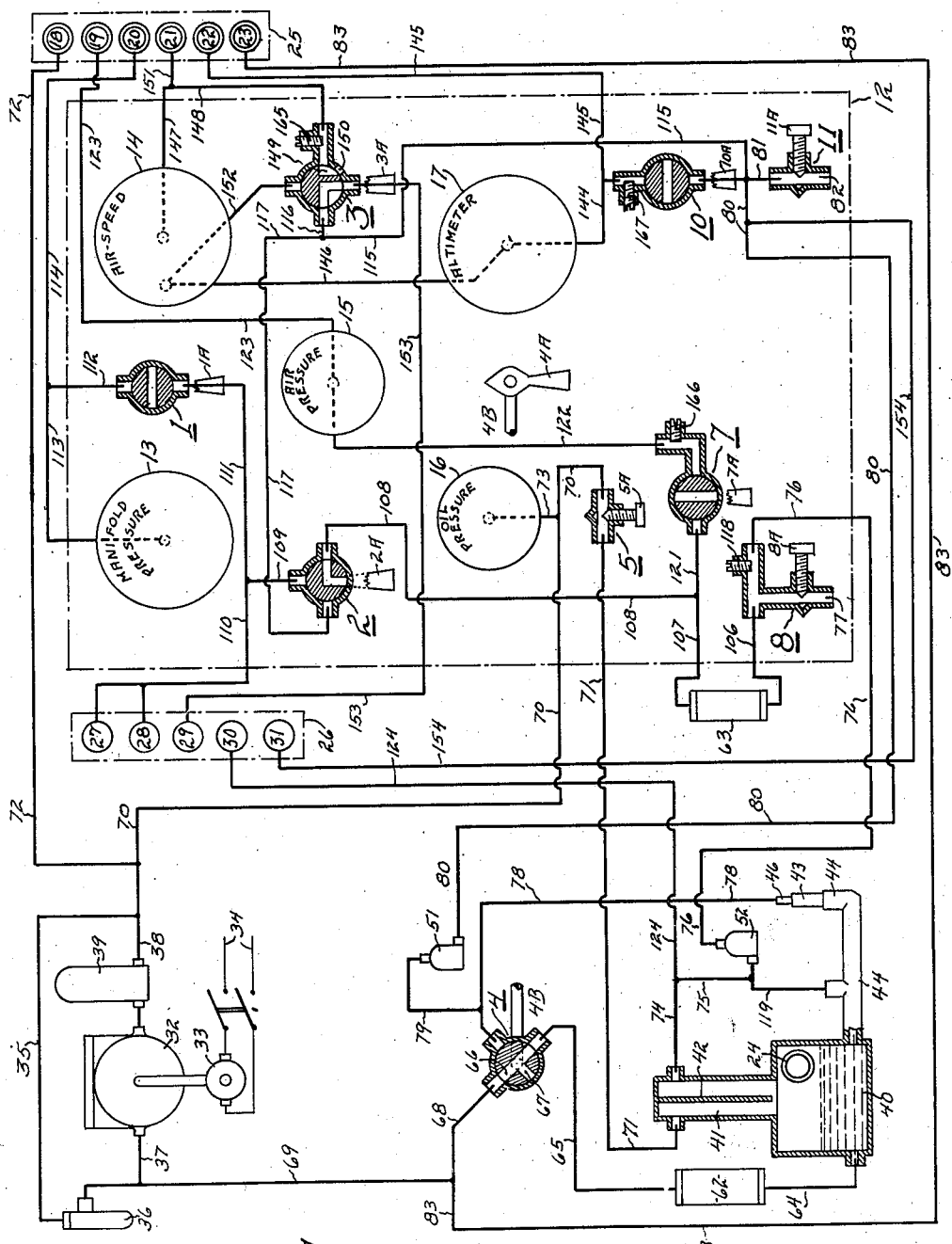
Fig. 1 is a diagrammatic view illustrating a testing apparatus such as referred to hereinbefore in one embodiment of my invention.

Figs. 13, 14, and 15 are views similar to a part of Fig. 1 but in greatly simplified diagrammatic form to illustrate an underlying principle of my invention by which a pump is caused to deliver oil pressure and air pressure, selectively, in response to the operation of a selector valve, and by which, as in these three views respectively, by-passes are variably throttled to cause the pump to deliver variable oil pressure, variable air pressure, and variable vacuum;

Figs. 16 and 17 are views in simplified diagrammatic form illustrating a modification of the underlying principle of Figs. 13, 14, and 15.

Referring to Fig. 1 of the drawing, I have shown in broken outline at 12, a control panel on which certain master instruments and valves and valve operating handles are mounted. I have found it to be convenient in a practical structure for the apparatus of Fig. 1 (to be more fully described) to be assembled in a box-like structure or frame not shown, of which the panel 12 is the top cover. The control panel valves and the conduit connections thereto would in actual practice be mounted on the underside of the panel and the instruments and valve operating handles on top of it; but for clearness of the description to follow, these parts are shown in solid line, and only the outline of the panel is shown.

There are five indicating master instruments on the panel, at 13 to 17 inclusive, the types of which are indicated by the legends thereon; and these instruments are preferably standard aircraft instruments and are known to be reliable and to read correctly.

The control panel valves are designated by reference characters 1, 2, 3, 4, 5, 7, 8, 10, and 11, and the handles for operating them are designated by these same numbers with the suffix A. It will be noted that the valve handle 4A is mounted upon the panel 12, but the valve 4 itself has been shown as not on the panel but as mounted upon apparatus that in practice would be under the panel, and is shown as connected to the valve handle 4A by a mechanical connection 4B.

Seven normally closed and sealed service couplings are provided, 18 to 24 inclusive, the first six being assembled upon a common support 25 and disposed at the side of the apparatus, and in practice under the control panel 12 for ready access; the coupling 24 however being separated therefrom for a purpose to be described. These couplings may all be alike and are preferably of a known, self-sealing, quick-connecting-and-disconnecting type.

Each of these known couplings has a female part permanently connected to a corresponding conduit of the system of Fig. 1, and is normally sealed by a valve. A male part of the coupling is connected to a hose or conduit through which fluid pressure or vacuum is to be communicated to an instrument or apparatus to be tested. When the male part is inserted into the female part it opens the valve and is locked or latched (detachably) to the female part. Such couplings being well known and commercial need not be illustrated or further described.

Further, as to the master instruments 13 to 17 inclusive, they each have an indicating dial scale and a pointer movable thereover, not shown, but are of conventional aircraft design, and preferably have the following indicating ranges.

The "manifold pressure" instrument 13, calibrated in inches of mercury, normally registers atmospheric pressure, and when subjected to vacuum in the use of the apparatus, will indicate down to approximately 10 inches of mercury, and when subjected to air pressure will indicate up to 75 inches of mercury.

The "air speed" instrument 14 will indicate the differential pressures to which it is subjected in the use of the apparatus, corresponding to air speeds up to 700 miles per hour.

The "air pressure" instrument 15 will indicate air pressure up to 25 pounds per square inch.

The "oil pressure" instrument 16 will indicate oil pressure up to 300 pounds per square inch.

The "altimeter" instrument, subjected to vacuum in the use of the apparatus, will indicate atmospheric pressure from that at the earth's surface up to 50,000 feet altitude, and can be adjusted to the former.

Upon a support 26, are mounted five valves 27 to 31 inclusive, and this support 26 in a practical apparatus would be a part of the said frame under the panel 12, and supporting these valves so as to be accessible from the side. The valves 27 and 30 are air pressure relief valves and the valves 28, 29, and 31 are vacuum relief valves, to prevent the pressure or vacuum from attaining a value higher than a predetermined safe maximum. These valves may be of any known, commercial or suitable construction, and a brief description will therefore be sufficient. Each of them is connected by a conduit to the system of Fig. 1, and each of them has a valve element which is normally held closed by a spring, and the pressure or vacuum of the conduit communicating with it is in the direction to open the valve against the spring pressure and effect communication between the conduit and the atmosphere. Each of them is adjustable by adjusting the spring tension, to adjust the pressure or vacuum at which the valve opens.

The pressure and vacuum relief valves 27 and 28 are both associated with the master "manifold pressure" instrument, and the relief valves 29, 30, and 31 are respectively associated with the master "air speed," "air pressure" and "altimeter" instruments; and in the operation of the apparatus of Fig. 1, are connected to the air pressure or vacuum developed in the apparatus, only when the corresponding master instrument is so connected and is being used; so that each relief valve operates independently of the others and may have its own individual adjustments, and this adjustment corresponds to the maximum indicating range of the master instrument with which it is associated, to protect both it and the instrument or apparatus being tested from too high air pressure or vacuum.

A rotary pump 32 is driven preferably by an electric motor 33 which is supplied with current by mains 34—34. The motor 33 is preferably a universal motor whereby it may be operated from direct or alternating current mains. The pump 32 may be of any known or suitable construction for the purposes described, but is preferably a rotary pump and one the rotor of which is oil sealed and one which will pump either a flow of oil or a flow of air, and one which when pumping oil is capable of developing pressures up to 300 pounds per square inch, and when pumping air can develop 25 pounds per square inch or pull a vacuum of 26½ inches of mercury, and one having a capacity of 2 gallons of oil per minute at 300 pounds per square inch.

A relief by-pass 35 is provided around the pump 32 in which is a pressure release valve 36 of known construction which normally holds the by-pass 35 closed but which opens it if for any reason the pressure developed by the pump 32 should attain the top maximum value of 300 pounds per square inch, to which the valve is adjusted.

The pump has an inlet conduit 37 and an output conduit 38, and any pulses or surges of pressure in the output conduit 38 are absorbed or eliminated by a pressure dome 39 connected to the output conduit, and of well known construction and operating in a well known manner.

At 40 is an oil reservoir partly filled with oil; and at 41 is an air-oil separator. As will be described, when the pump 32 is pumping oil, oil may in some cases be drawn from the reservoir 40 and pumped through the conduit system and returned to the reservoir. When the pump 32 is pumping air, the pump is kept sealed by oil supplied to it at a small rate, and the pumped air flows through the separator 41 which is above the reservoir, and any oil that may be carried along with the air impinges upon a partition 42 and is separated out and falls into the reservoir 40. This oil reservoir and air-oil separator unit may be of any suitable or known construction and is shown diagrammatically, and its operation will become apparent later.

Figures 2, 3:
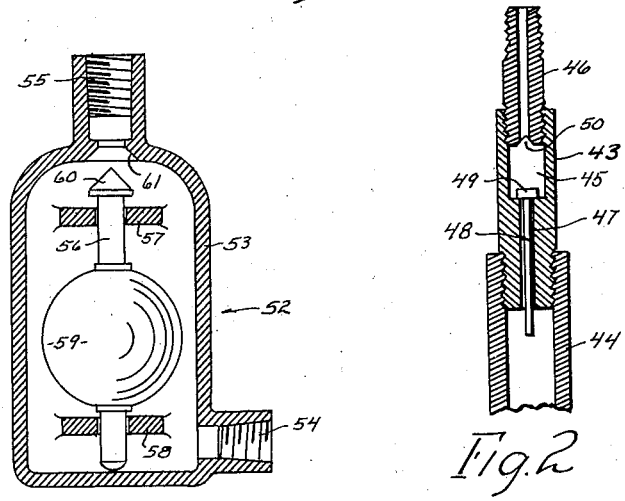
Fig. 2 is a longitudinal sectional view of an oil metering valve which I may employ, and which is shown diagrammatically in Fig. 1 to a smaller scale.
Fig. 3 is a longitudinal sectional view of a float valve which I may employ, and which is shown diagrammatically to smaller scale in Fig. 1.

The flow of oil to seal the pump while pumping air, is drawn into the pump at its intake side, through a metering valve. For this valve I prefer to use the construction shown in Fig. 2.

A valve housing 43 has an oil supply conduit 44 screwed upon its lower end and connected with the reservoir 40, as shown in Fig. 1; and the upper end of the housing 43 has a chamber 45 therein, into the upper part of which is screwed a nipple 46 which is, as will be described, connected to the intake side of the pump when it is pumping air. The chamber 45 communicates by a bore 47 with the conduit 44. A valve 48 in the form of a rod having a head 49 thereon is provided, the rod 48 being disposed in the bore 47 and the head 49 normally resting upon the bottom wall of the chamber 45. A very small clearance between the rod 48 and bore 47 is thereby provided. A notch 50 is provided on the lower end of the nipple 46 and is therefore in the chamber 45.

The suction of the pump at the nipple 46 draws oil in from the conduit 44 and it flows upwardly through the bore 47 and lifts the valve 48 and carries the valve upwardly until its head 49 engages the lower end of the nipple 46. The oil then flows around the head 49 of the valve and through the notch 50 and out through the nipple 46, metering the flow partly by the size of the notch 50 and partly by the small cross sectional area of the clearance in the bore 47 around the valve 48. When the suction from the pump is discontinued, the valve 48 falls by gravity to the position illustrated. Thus each time that the pump is caused to pump air, the valve 48 rises and each time that the pumping of air is discontinued it falls, and it thus intermittently reciprocates in the bore 47 and keeps the bore clean and free from the variable restriction to the flow which would result if small particles of dust or dirt were to accummulate in the bore. The net area of the passageway for the flow of oil through the bore 47 may therefore be very small, and so small in fact that without the intermittent cleaning action of the reciprocating valve 48, it might tend to plug or vary the rate of flow.

At 51 and 52 are normally open, float-closable valves connected in the line of certain air flow conduits, and are for the purposes of protecting instruments and other parts of the test apparatus as well as apparatus being tested, against flow of oil thereto. If for example an inexpert operator should put too high a level of oil in the oil reservoir 40, then, with the pump pumping air, oil might be picked up by the air lines and carried to parts of the air system. In such cases these float valves would operate and close the air conduit lines in which they are connected, and prevent the flow of oil in them. These float valves may be of any known or suitable construction, the preferred form being shown in Fig. 3, where the float valve 52 is illustrated somewhat diagrammatically.

A housing 53 is threaded as at 54 to receive an air incoming conduit; and is threaded as at 55 to receive an air outgoing conduit. A valve stem 56 is vertically disposed and guided in upper and lower bearings 57 and 58 in the housing, and between these bearings is connected to a float 59. The upper end of the stem 56 is conical as at 60 and functions as a valve. Air flowing upwardly through the housing 53 passes out of the housing through a conical valve seat 61. The float 59 is normally in the position illustrated and the air flow goes upwardly around it through the housing and through the valve seat. If oil should accumulate excessively in the housing by being carried in with the air, it will raise the float 59 and close the valve 60—61 before the oil can reach the valve seat 61 and flow out into the outgoing conduit.

Returning to Fig. 1, at 62 is an oil filter of known construction for filtering out solid matter, particles of dirt, etc., from the oil on its way to the pump 32 when the pump is pumping oil; and at 63 is an air filter for filtering and cleaning air pumped to the master instruments and apparatus being tested, when the pump is pumping air.

The hand operated valves referred to above are shown in Fig. 1 in what may be called a normal position for the apparatus. The ports of these valves have been illustrated to a scale which makes the type of valve apparent, and they will be more fully described together with the conduits which they control and not referred to above, in connection with a description of the operation of the apparatus which follows.

As mentioned hereinbefore, the testing apparatus of Fig. 1 can selectively deliver fluid pressure and vacuum to apparatus to be tested; and the fluid pressure can be oil pressure or air pressure. Apart from the type of apparatus to be tested, the capabilities of the testing apparatus may be listed as follows.

It can deliver oil under static oil pressure to an instrument or apparatus through which the oil itself does not flow; or a volumetric flow of oil to an apparatus through which the oil flows under the impulsion pressure from the pump; or a volumetric flow of oil to an apparatus through which the oil is caused to flow by being pulled by the intake or suction side of the pump; or static air pressure to an instrument or apparatus through which the air does not flow; or a volumetric flow of air to an apparatus through which the air flows under the impulsion of the pump pressure; or a volumetric flow of air through an apparatus through which it is pulled by the intake or suction side of the pump; or static vacuum to an instrument or apparatus through which the air does not flow; and the control of the volumetric flow may in each case be regulated and controlled either by the testing apparatus itself or by controls on the apparatus being tested.

In the following are given examples of these uses of the testing apparatus of Fig. 1, and in order to make more apparent the operation of the apparatus, each of these examples is illustrated in separate figures, Fig. 4 to Fig. 12 inclusive, in which only those parts of Fig. 1 which are in use in each case are illustrated; and these figures while having the same reference characters as Fig. 1, have been in some cases contracted or distorted to reduce the size of the figures.

Figures 4, 4A, 4B:
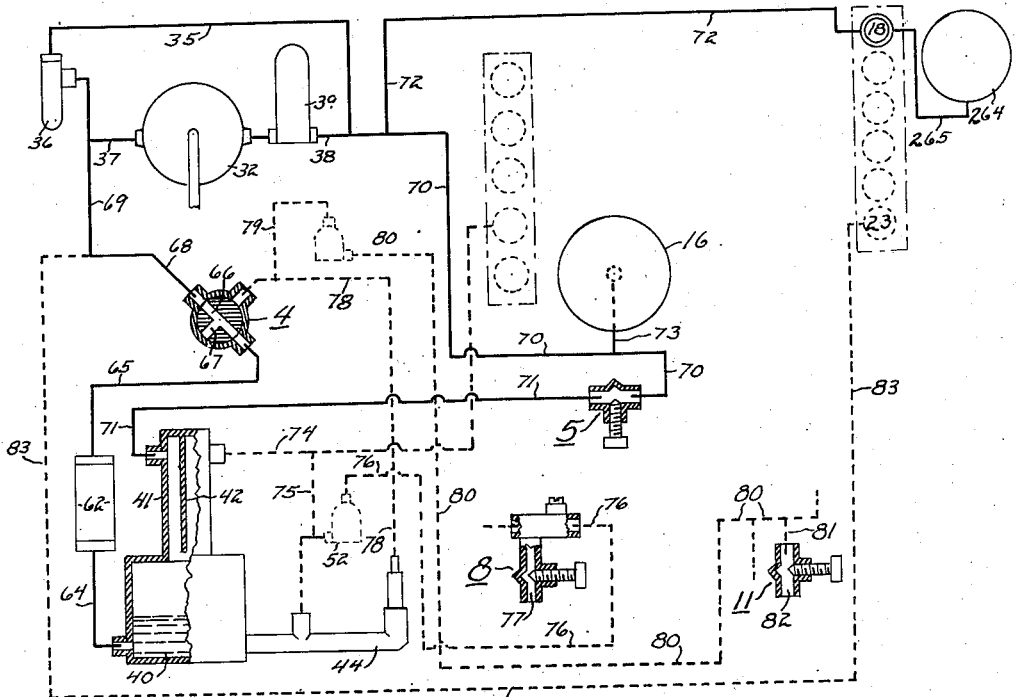
Fig. 4 is a view similar to a part of Fig 1, illustrating the parts thereof which function when the apparatus is delivering static oil pressure.
Fig. 4A is a fragmentary view similar to a part of Fig. 4 illustrating in connection therewith an accessory device which I may in some cases employ.
Fig. 4B is a view showing a valve of Fig. 4A in a different operative position.

*Static oil pressure, Fig. 4*

In this illustrative example, the apparatus 264 to be tested is an oil pressure indicating instrument or pressure gauge. It is connected by a hose or other conduit 265 to the service coupling 18. The valve 4 is set to the position indicated in Fig. 4 which as referred to above is the so-called normal position. The valves 8 and 11 are needle valves and are set to open position. The valve 5 which is also a needle valve is set, at the start of the test, to open position. The pump 32 is started by starting the motor 33 as described for Fig. 1, and it pulls oil from the reservoir 40, by a conduit 64 connected to a lower part of the reservoir, through the oil filter 62, by a conduit 65 to and through the cross passage 66 of the valve 4 (this passage having a branch 67 which in this position of valve 4 is blocked off), and thence by conduits 68 and 69 to the pump intake conduit 37, through the pump and through the output conduit 38, by a conduit 70 through the open valve 5, by a conduit 71 into the air-oil separator 41 above the oil reservoir 40, where it impinges upon the partition 42 and flows downwardly back to the reservoir 40.

A conduit 72 is connected from the pump output conduit 38 to the said service coupling 18.

From the foregoing it will be seen that the open valve 5 is in a conduit by-pass across the output and intake conduits 38 and 37 of the pump, so that the oil flows freely through this by-pass and through the open valve 5, and develops substantially no pressure. It will be also noted that the conduit 72 is connected to the pump output conduit 38 and consequently at this time has substantially no pressure in it.

The master oil pressure instrument 16 of the testing apparatus is connected to the conduit 70 by a conduit 73 and therefore indicates no pressure.

The valve 5 is now progressively closed to throttle the flow in the said by-pass so that pressure develops in the conduit 70 and the conduit 72, and this pressure is registered both on the oil pressure gauge 264 being tested and on the master instrument 16.

By thus manipulating the valve 5, the gauge 264 may be caused to register any pressure within its range and this may be compared with the pressure indicated on the master instrument 16 which is known to be correct. If the gauge 264 is an aircraft gage it may be left in the aircraft while this test is being made; and if its indications correspond with those of the master instrument 16, then it is correct. If however its readings differ from those of the master instrument 16, then the instrument 264 is known to be defective and can be removed from the plane for correction or replacement.

In making this test, a small quantity of oil may be drawn from the reservoir 40 and supplied into the conduit 265 and the gage 264, and thus be subtracted from the closed system, and this may tend to produce vacuum in the conduit 74 which also communicates with the air-oil separator 41; but the conduit 74 is connected by a conduit 75, through the float valve 52, to conduit 76 and thence to the open needle valve 8, which at 77 is open to the atmosphere, so that no vacuum can develop; and since these conduit lines, although they are connected to the operating system, perform no function, they are indicated in Fig. 4 in dotted line.

Similarly vacuum may tend to develop in the conduit 44 communicating with the reservoir 40 and in the conduits 78, 79, 80, and 81, but the latter, since the valve 11 is open, communicate with the atmosphere at 82 so that no vacuum can develop. A conduit 83 is connected at one end to the conduit 69 and at the other end to the service coupling 23, but since this coupling is closed and sealed, nothing results from this connection.

The developed pressure is communicated to the relief valve 36 and therefore may be increased and decreased at will by the valve 5 in the range from zero up to 300 pounds per square inch for which the relief valve 36 is set.

In some cases it is desirable to make this test on an aircraft apparatus such as an oil pressure gauge, by an operator stationed closely adjacent to the aircraft instrument in its position on the aircraft, and to have a supplemental master pressure gauge with which he can compare the aircraft instrument; and it is also important that the oil in the testing apparatus system generally shall conform to certain aviation standards, and be kept pure and free from contamination either by oil of a different type in the aircraft apparatus being tested or by impurities in it.

In such cases, the testing apparatus as illustrated in Fig. 4 is supplemented by an accessory testing unit as shown in Fig. 4A where the testing unit is indicated as enclosed within the broken line rectangle 84.

This testing unit may be variously constructed as to its details, and is therefore shown somewhat diagrammatically in Fig. 4A, and comprises in general a housing 85 having a conduit passageway 86 therethrough controlled by a three-way valve 87 and a one-way valve 88. The valve 87 also controls a conduit line 89 communicating with an oil receptacle 90 having a vent to atmosphere at 91. A coupling 92 is provided by which a conduit 265 may be connected from the passageway 86 to the service coupling 18 on the testing apparatus. A coupling 93 is provided at the other end of the passageway 86 by which a conduit 94 may connect it to the instrument or oil pressure gauge 95 to be tested. A master instrument 96 is at all times in communication with the passageway 86 through a conduit 97. As shown, and proceeding from the coupling 92, the valve 87, the valve 88 and conduit 97 to the instrument 96 are disposed in the order here named.

To test the oil pressure gauge 95 by using this testing unit, the testing apparatus of Fig. 1 is put into the condition of Fig. 4 and for that reason only the extreme right hand parts thereof have been reproduced in Fig. 4A.

Before starting the pump, the valve 87 is set to the position illustrated in Fig. 4A which blocks off the receptacle 90, and the full pressure of the pump when started develops in the passageway 86 being blocked off at the valve 88. In this connection it will be noted from the description of Fig. 4, that if the valve 5 be closed this pressure will go on increasing up to the relief limit of the pump 32, but optionally a lower maximum may be preselected for the test by positioning the valve 5 to indicate a lesser pressure on its oil pressure master instrument 16 of Fig. 1.

The valve 88 is now turned to allow oil under pressure to pass it, and the pressure will be registered both on the testing unit instrument 96 and on the aircraft instrument 95 and readings of the two may be compared. The pressure to the instruments may be admitted slowly by the valve 88 and then cut off by again closing the valve 88 to bring the indicating pointers of the instruments 96 and 95 to rest for comparison; and in this way the entire ascending scale of the instrument 95 may be tested point by point. The valve 87 may now be turned to the position indicated in Fig. 4B. This blocks off the approach pressure from the pump and connects the receptacle 90 to the instruments 96 and 95, and allows the oil to return or drain into the receptacle 90. By closing and then opening the valve 88, the descending indications on the instruments 96 and 95 may be successively determined and compared.

Any impurities or oil properties foreign to the oil in the testing apparatus of Fig. 1 will be prevented from contaminating the latter by being caught in the receptacle 90 from which it may be drained or discharged at a discharge outlet 98 after the test unit has been disconnected from the main system at the completion of the test.

*Volumetric oil flow, Fig. 5*

A test of this class would as an example be a component only of an automatic pilot hydraulic servo unit, as a closed system without vent to the atmosphere. A supply conduit 99 for the apparatus to be tested and shown diagrammatically at 100, is connected to the service coupling 18; and to return the oil to the pump system, a conduit 101 is connected at one end to the apparatus 100 and the other end is connected to the coupling 24 communicating with the reservoir 40. The connections are otherwise made the same as for Fig. 4.

With the valve 5 open, oils flows through the by-pass 70—79, etc., as described for Fig. 4. The valve 5 may be manipulated to throttle the flow through this by-pass, and pressure then develops in the conduits 70 and 72 and causes oil to flow to the tested apparatus 100 and by conduit 101 back to the reservoir 40, variably as the valve 5 is manipulated, and the pressure may be read on the master instrument 16. In some cases, the valve 5 can be closed and left closed, and the flow of oil and pressure would then be adjusted for tests at the apparatus 100.

*Volumetric oil flow, Fig. 6*

In some instances, the apparatus to be tested, for example an autopilot hydraulic servo unit and its accessories as on the aircraft, including its own oil sump and vent to atmosphere and relief valve, and indicated diagrammatically at 102 in Fig. 6, is an apparatus in which the pressure and rate of oil flow through it, etc., are controlled at the tested apparatus itself, and the pressure indicated on its own gage. For a volumetric oil flow test of this type, the input to the tested apparatus is connected by a conduit 103 to the service coupling 18 and an outlet conduit 104 therefrom is connected to the service coupling 23. The valve 4 is set to the position shown in Fig. 6 by which the duct 66 blocks off the pump conduits 68 and 69 from the rest of the testing apparatus. The valve 5 is closed as shown, but the conduit 70 is still connected to the master pressure instrument at 73.

Upon starting up the pump by its motor, oil is circulated from the output conduit 38, through the conduit 72, and thence through the tested apparatus 102, and back to the pump by the conduits 83 and 69.

While as stated the control of the flow will in this case be controlled and its pressure indicated at the tested apparatus 102, pressure developed will indicate also on the master instrument 16 of the testing apparatus.

Figure 7:
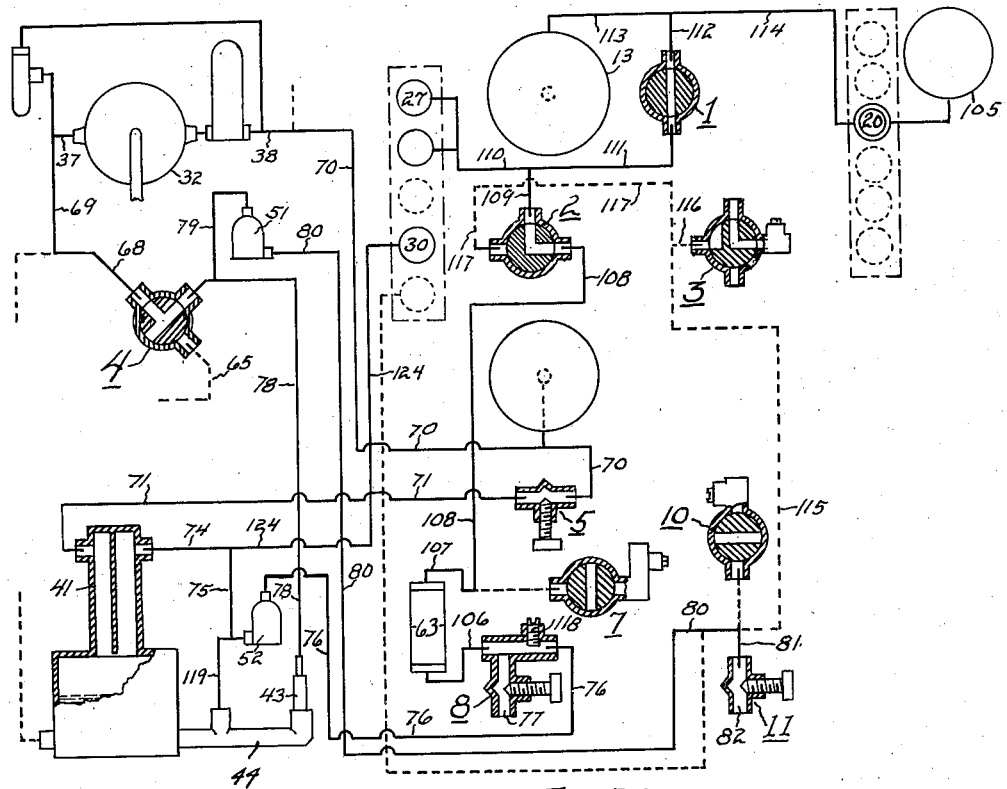
Fig. 7 is a view similar to a part of Fig. 1 illustrating the parts thereof which function when the apparatus is delivering static air pressure.
Figure 8:
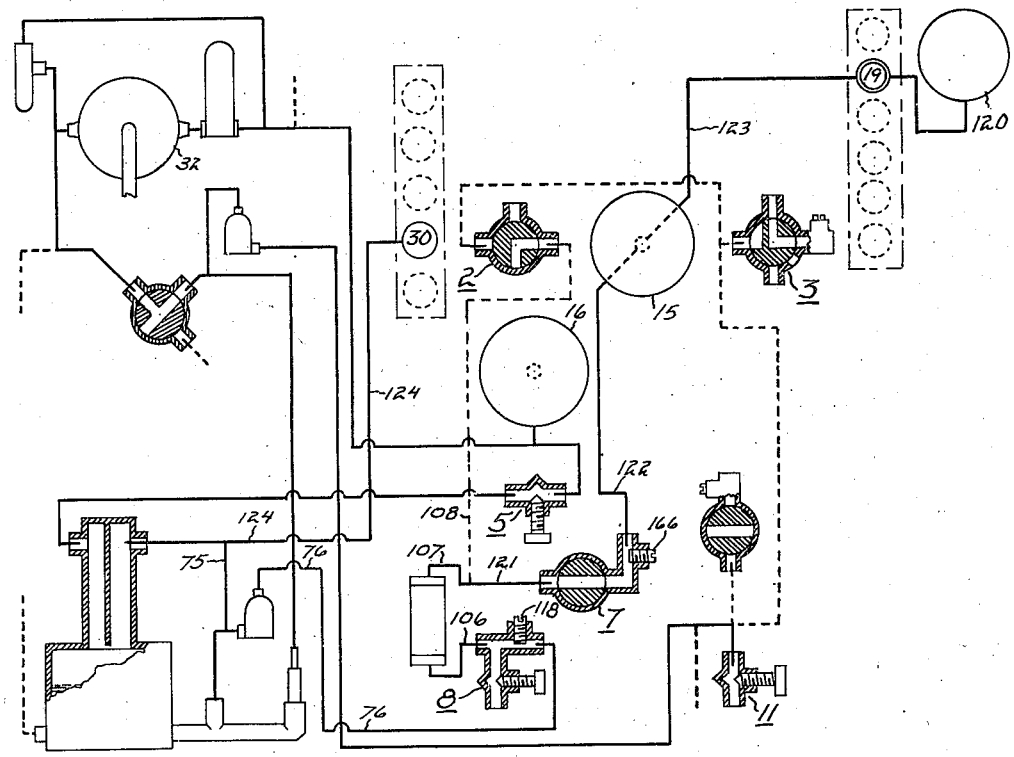
Fig. 8 is a view similar to Fig. 7 but showing the parts for delivering static air pressure of a different range of values from that of Fig. 7.

*Static air pressure, Figs. 7 and 8*

In Fig. 7 is illustrated the use of the testing apparatus of Fig. 1 in testing an air pressure operated apparatus, for example the air pressure of an airplane de-icer apparatus, 105. To set the apparatus of Fig. 1 for this test, the valves are set to the positions shown in Fig. 7, the position for the valve 4 being that which causes the pump 32 to pump air. The gage 105 to be tested is connected by a conduit to the coupling 20. It will be noted that the valve 4 in the position illustrated has cut off the oil supply conduit 65.

Upon starting the motor 32, air is drawn by the pump through the open valve 11 at 82, and by conduits 81 and 80, through the float valve 51, by conduit 79, through the valve 4 to the conduits 68 and 69, into the pump at intake conduit 37, out at the pump output conduit 38, by conduit 70 to and through the open valve 5, by conduit 71 to and through the air-oil separator 41, by conduits 74 and 75 through the float valve 52, and by conduit 76 through the open valve 8 and thence out to atmosphere at 77.

There will inevitably be some resistance to the flow on the pressure side of the pump and on the intake side of the pump so that there will be an effective suction in the conduit line 78 which is connected to the metering valve 43, and oil is drawn therethrough from the reservoir, by conduit 44, conduit 78 and valve 4 and conduit 68 to the pump, and at a sufficient metered rate to maintain its oil seal.

From the conduit 76 at its juncture with the valve 8, a conduit 106 leads through the air filter 63 to a conduit 107 leading to a conduit 108, to the valve 2 in its position of Fig. 7. From the valve 2 a conduit 109 connects with conduit 110 and 111, the conduit 110 leading to the manifold pressure relief valve 27 and the conduit 111 leading by way of valve 1 to a conduit 112 which connects with conduits 113 and 114, the conduit 113, leading to the master manifold pressure instrument 13 and the conduit 114 leading to the service coupling 20 to which the instrument 105 to be tested is connected.

A conduit 115 leads from the juncture of conduits 81 and 80 (above the valve 11) to a conduit 116 at the valve 3, and thence by a conduit 117 to the valve 2, but these conduits are rendered ineffective by the positions of the valves 2 and 3 and hence are shown in dotted line.

With the pump going, air enters as described from the atmosphere at the valve 11 and is discharged back into atmosphere at the valve 8; and the valves 11 and 8 and the atmosphere thus constitute a by-pass around the pump. The valve 8 is now gradually closed, throttling this by-pass by constricting the outlet to atmosphere, and as a consequence, pressure develops in the conduit system 106 to 114 inclusive, the pressure being indicated on the manifold pressure master instrument 13 and registering on the gage 105. The more the valve 8 is closed the higher will this pressure be and the higher will the readings be on the instruments 13 and 105 and they may therefore be compared point by point. Upon gradually lowering the pressure by opening the valve 8, descending readings can be compared. To protect both instruments, the manifold pressure relief valve 27 is set to relieve the pressure at a suitable value referred to above.

A leak test may be made on the gage 105, by first raising the pressure at the valve 8 until the gage 105 reads a high value, and then turning the valve 1 to the closed position, cutting off the communication of pressure thereto and holding the pressure in the conduits 112, 113, and 114 and in the instruments 13 and 105.

In the line of the conduit 76 leading to the valve 8, is provided an adjustable restriction by means of a screw 118 projecting into the conduit. This is provided for two general purposes. If the valve 8 in making the aforesaid test were suddenly opened wide, the rush of air into and through the float valve 51 or the float valve 52 might cause the float 59 of the valve (see Fig. 3) to be lifted and close the valve 60—61 before the pressure on each side of the float could become equalized. This restriction 118 also insures that there will be at least a minimum pressure in the conduit 76 and therefore in the conduits 75, 119, 74, and the interior of the oil reservoir 40 and air-oil separator 41 to insure that there will be some pressure to cause the metering of oil through the metering valve 43 to the pump.

In some cases the instrument to be tested will have a greater indicating range of pressure than that of the gage 105, in which cases it is desirable to use the master air pressure instrument 15 of Fig. 1. In such a case, the apparatus would be set as in Fig. 8. The instrument to be tested, in this case 120, is connected to the service coupling 19, the valves 5, 8, 11, and 3 are the same as in Fig. 7, but the valves 7 and 2 are set to the positions shown in Fig. 8.

The conduit 108 is now ineffective being blocked off at the valve 2. The valve 7 being open, there is now a connection from the conduit 107 to a conduit 121, through the valve 7, to a conduit 122 to the air pressure master instrument 15, and thence by conduit 123 to the service coupling 19.

The rest of the system will be seen to be the same as that of Fig. 7. When the valve 8 variably throttles the said air by-pass, pressure develops in the conduits 106, 107, 121 to 123 inclusive and is communicated to the instrument 120, and its readings may be compared with the readings on the master instrument 15. With the instruments indicating a high value of pressure, then upon closing the valve 7, the pressure is locked in the instruments and if there is leak, it will be indicated by descending readings on the instrument scales.

The air pressure relief valve 30 is connected by a conduit 124 to the pressure side of the valve 8 by way of conduits 75 and 76 and will open to protect the system if the pressure exceeds the value for which it is set. While this relief valve 30 is also connected to the system in the same way when used for testing as in Fig. 7, it is then ineffective because it is set for a higher value than the manifold pressure relief valve 27.

Figure 9:
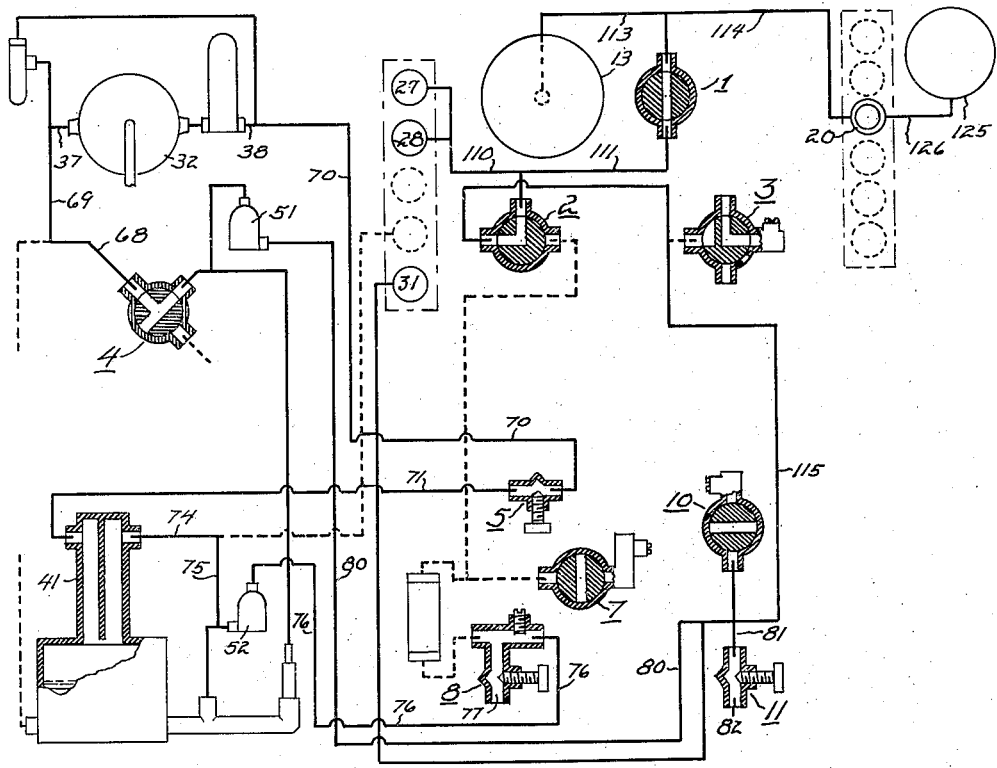
Fig. 9 is a view similar to a part of Fig. 1 illustrating the parts thereof which function when the apparatus is delivering static vacuum.

*Static vacuum, Fig. 9*

An illustrative apparatus to be tested by static vacuum is a manifold pressure gage or any other absolute pressure instrument. The apparatus to be tested is shown diagrammatically at 125 in Fig. 9, and is connected by a conduit 126 to the service coupling 20. The valves are set to the positions illustrated in Fig. 9, valve 4 being in the selected position to cause the pump to pump air. The valves 8 and 11 are both open at the start. The pump 32 pumps air, drawing it in from the atmosphere through the valve 11 at 82 and through conduits 81 and 80, through the float valve 51, and thence through the valve 4, and conduits 68 and 69 and the pump intake conduit 37, and out at the pump output conduit 38, through conduit 70, valve 5, conduit 71, through the air-oil separator 41, through conduits 74, and 75 and float valve 52 through conduit 76 and thence to the valve 8, and out to atmosphere at 77.

The valve 11 is now progressively closed and as a consequence vacuum develops in the conduit 81 and this vacuum is communicated through the conduit 115, through the valve 2 to the conduits 110 and 111, and through the valve 1 to conduits 113 and 114. The vacuum in the conduit 110 is communicated to the vacuum pressure relief valve 28, and the vacuum in the conduit 113 actuates the master instrument 13; and vacuum in the conduit 114 is communicated through the service coupling 20 to the apparatus 125 to be tested. As the valve 11 is progressively closed, the instrument 13 and the tested apparatus 125 indicate higher and higher vacuum, being protected against too high a vacuum by the relief valve 28; and as the valve 11 is progressively opened again, the vacuum decreases. Ascending and descending readings may therefore be made on the master instrument 13 and apparatus 125. For a fairly high reading on the instruments, the valve 1 may be closed to check for leaks as referred to hereinbefore.

When the pump, as described, pumps air, and it is drawn in from the atmosphere at the valve 11 and discharged back to atmosphere at the valve 8, the valves 8 and 11 and the atmosphere constitute a by-pass across the pump. When the valve 11 is progressively closed it throttles this by-pass and vacuum in the system develops as a consequence. This by-pass is therefore the same by-pass as described above in connection with Figs. 7 and 8, the difference being in the point in the by-pass at which it is throttled to selectively develop pressure (Figs. 7 and 8) and vacuum (Fig. 9).

Conduit connections in Fig. 9 which are ineffective because of the valve positions are, as hereinbefore, shown in dotted line.

Figure 10:
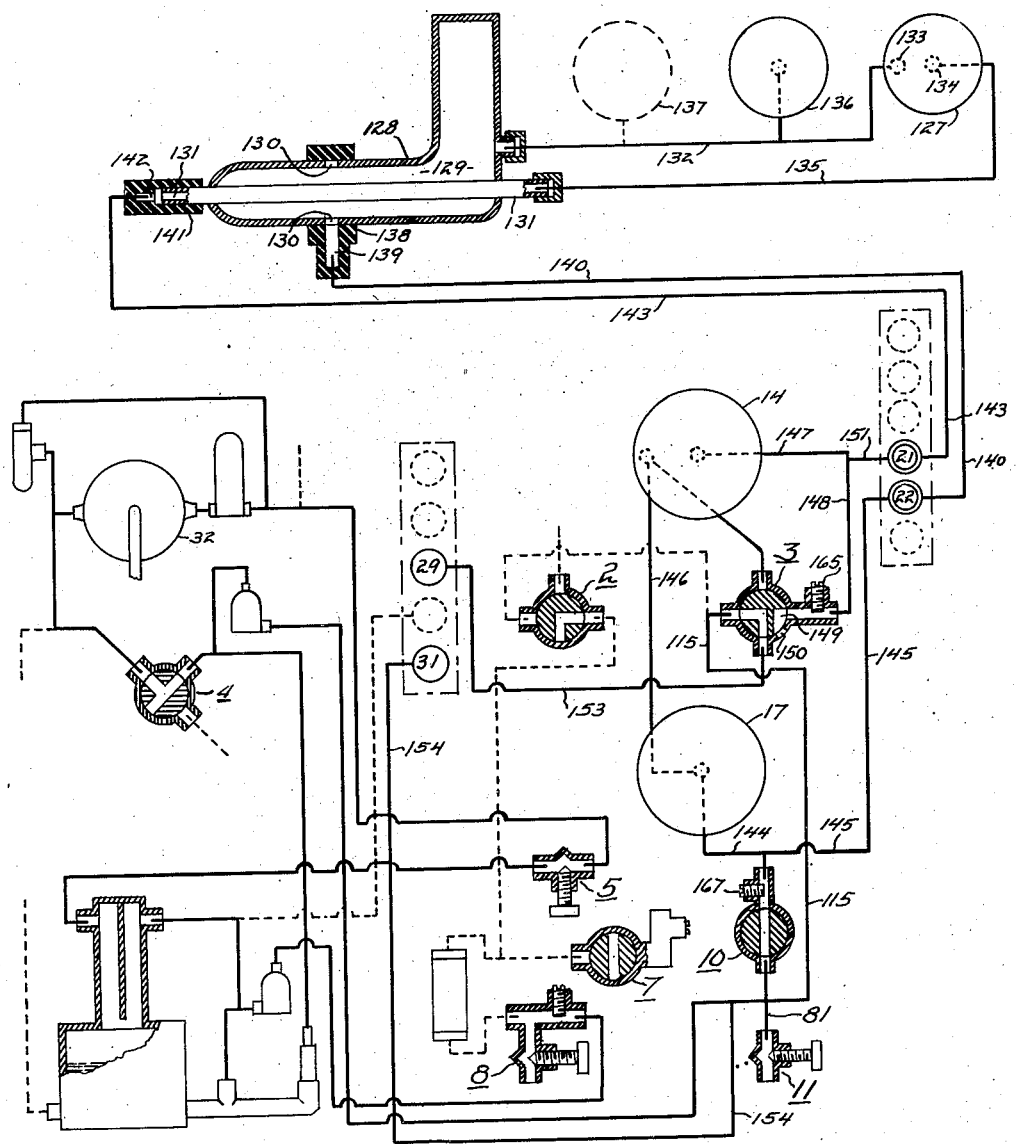
Fig. 10 is a view similar to a part of Fig. 1 illustrating the parts thereof which function when the apparatus is delivering static vacuum to an air speed indicator on an aircraft connected to the static and Pitot conduit lines of the conventional Pitot-static head of the aircraft.

Static vacuum, air speed indicator test, Fig. 10

In this test, Fig. 10, the apparatus 127 to be tested, is an air speed indicator on an aircraft. This instrument is conventionally one that is subjected at one side to static atmospheric pressure, uninfluenced by the forward movement of the aircraft, and subjected at its other side to pressure produced by the forward movement, these pressures being provided by a Pitot-static head on the forward part of the aircraft; and this head and the conduit connections thereto as conventionally employed is shown diagrammatically in Fig. 10 at 128. The head comprises a closed chamber or housing 129 communicating with the outside atmosphere through ports 130—130, whereby the chamber is under said static atmospheric pressure. The open end of a Pitot tube 131 projects forwardly from the chamber and the interior of the tube is therefore subjected to the air pressure caused by the forward speed of the aircraft. A static conduit line 132 leads from the static pressure chamber 129 into the aircraft and is connected as at 133 to one side of the air speed indicator 127 and the other side 134 of the indicator is connected by a Pitot conduit line 135 to the Pitot tube 131.

It is to be noted also that it is conventional to connect the altimeter 136 and the rate of climb indicator 137 to the static line 132, as shown diagrammatically in Fig. 10.

In making this test of the air speed indicator 127, the connection of the rate of climb indicator 137 to the line 132 is preferably broken and sealed and this is indicated by showing it in dotted line.

Also, the ports 130—130 are closed and sealed by an accessory clamp device 138 which provides communication through a duct 139 with one of the ports; and a conduit line or hose 140 is connected to the device 138 in communication with that port 130.

Also, a Pitot tube closing accessory device 141 closes the end of the Pitot tube 131, but by means of a duct 142 therethrough, it communicates with a conduit or hose 143 coupled to the device 141.

The devices 138 and 141 constitute no essential part of the present invention and their use in connection with a Pitot-static head in testing aircraft instruments by other means and by other methods is known.

The conduit or hose 143 is connected to the service coupling 21 of the testing apparatus as shown in Fig. 10. The conduit or hose 140 is connected to the service coupling 22.

On the testing apparatus, the valves are set to the positions shown in Fig. 10, the selector valve 4 being in the position to cause the pump 32 to pump air. When the pump is running it pumps air in at the valve 11 and out at the valve 8, by the same arrangement of conduits and valves as described above (for Fig. 9) air entering at the valve 11 and being discharged at the valve 8. The positions of the valves 2 and 7 are such that they block off the system beyond the valve 8. As the valve 11 is progressively closed, vacuum develops in the conduit 81 and this is communicated through the open valve 10 to conduits 144 and 145, the conduit 144 communicating the vacuum through a conduit 146 to the static side of the air speed master instrument 14, and the conduit 145 communicating the vacuum to the service coupling 22, and thence by the hose 140 to the static pressure chamber 129 and thence by the static line 132 to the static side of the aircraft air speed indicator 127.

The master air speed instrument 14 has its Pitot or pressure side connected by conduits 147 and 148 to atmosphere through a passageway 149 and a port 150 of the valve 3; and the Pitot or pressure side of the aircraft air-speed indicator 127 is also connected to atmosphere through the Pitot line 135, tube 131, hose 143, to service coupling 21, and by conduit 151 to conduit 148 and to the said atmosphere vent 150 of the valve 3.

The air speed pressure relief valve 29 limits the vacuum that may be attained to protect the instruments in this test, and it is connected by conduit 153, through the main passage of valve 3, to the vacuum line 115 which is connected to the vacuum conduit 81.

The altimeter vacuum relief valve 31 is also at this time connected to the vacuum by conduit 154, but is ineffective because its relief vacuum value is higher than that of the valve 29.

With the above connections, upon closing down the valve 11 to progressively develop vacuum, readings on the master instrument 14 and the aircraft instrument 127 may be compared, ascending or descending; as has been referred to hereinbefore; and the valve 10 may be closed to lock the vacuum in the instruments to test for leaks.

It will be observed that both the master altimeter instrument 17 and the aircraft altimeter 136 are, during this test, subjected to vacuum, and they may be read to test the altimeter 136 but only up to the degree of vacuum to which the air speed instruments are subjected during the test.

Static vacuum, altimeter test, Fig. 11

This test is made upon the altimeter of the aircraft and is capable of testing it to indicated altitudes of 50,000 feet. The operation of the testing apparatus itself to produce testing vacuum and all of the connections thereto will be the same as for the air speed instrument test of Fig. 10 above described, with the exception of the position of the valve 3, and therefore only a part of the testing apparatus needs to be shown in Fig. 11 to be understood.

The valve 3 is set to the position shown in Fig. 11 and upon operation of the pump, vacuum develops in the conduit lines 144 and 145. The conduit 144 communicates vacuum to the master altimeter instrument 17 and by conduit 146 to the static side of the air speed master instrument 14, and this same vacuum is communicated through the conduit 152 through the valve 3 in the position illustrated and by conduits 148 and 147 to the other side of the air speed master instrument 14; so that this instrument is not operated or affected by the vacuum, and the vacuum to operate the altimeter instrument 17 may therefore be raised to a degree which might otherwise injure the air speed instrument.

Vacuum in the conduit line 145 is communicated to the service coupling 22 and by hose 140 to the accessory 138, to the static line 132 of the aircraft as described for Fig. 10; and thence to the aircraft altimeter 136; and also to the static side of the air speed indicator 127; and the other side of the air speed indicator is connected by conduit 135, Pitot tube 131, accessory 141, hose 143 to the service coupling 21, and by conduits 151 and 148, valve 3, and conduit 152 to the vacuum line 146—144; so that both sides of the aircraft air speed indicator are also subjected to equal vacuum and it is thereby also protected against injury. The altimeter vacuum relief valve 31 is connected to the vacuum source by conduit line 154, but the air speed vacuum relief valve 29, which is set for a lower vacuum relief, is cut off at the valve 3.

With the pump pumping air, and upon closing down the valve 11, vacuum is developed, and the vacuum is indicated on the master altimeter instrument 17 and the aircraft altimeter 136, indicating altitudes; and because the air speed instruments are not affected by the vacuum, the altitude indications can be raised by increasing the vacuum at the valve 11 to 50,000 feet, the pump being capable of producing the degree of vacuum corresponding to this altitude. Both rising and descending readings on the master altimeter 17 and the aircraft altimeter 136 may be made and compared, and again upon closing the valve 10 a blocking off or leakage test may be made on the instruments.

I am aware that it has heretofore been proposed to test aircraft altimeters and air speed indicators which are normally both operated by their conduit connections with a Pitot-static tube or head, but so far as I am aware I am the first to propose the testing of the altimeter, having such connections, in the upper part of its altitude range without first having to disconnect the air speed indicator from the Pitot-static head; and so far as I am aware I am the first to propose protecting the air speed indicator from the high vacuum at which the altimeter is tested, by subjecting both sides of it to the same pressure or vacuum while maintaining its normal operative connections with the Pitot-static head.

*Air flow, vacuum, rate of climb indicator test, Fig. 12*

In making this test, vacuum is developed by the testing apparatus and is communicated to the rate of climb indicator on the aircraft and also to a master rate of climb instrument, and the vacuum is increased and decreased by a control valve. The two instruments respond simultaneously to the increase and decrease of vacuum; and by comparing the rate at which the readings on the aircraft climb indicator increase or decrease as compared with the rate at which the indications on the master climb instrument increase or decrease, the accuracy of the aircraft climb indicator may be tested. It has been found desirable therefore to have the master climb instrument closely adjacent to the aircraft climb indicator because their readings are compared while their readings are changing, and the operator must be able to observe both of them at the same time or nearly so. For this reason, a rate of climb testing unit is provided which may be taken up into the aircraft by the operator, and vacuum is supplied by the testing apparatus of Fig. 1, from outside the aircraft.

The test unit is indicated diagrammatically in Fig. 12 at 155 and may comprise any suitable structure supporting a master rate of climb instrument 156 and a vacuum changing operator's valve 157. A conduit 158 in the unit has couplings 159 and 160 at its ends, and between the couplings it is connected to the master instrument 156 by a conduit 161; and the control valve 157 connects the conduit 158 to the atmosphere at 162 as shown, under the control of a valve handle 157A.

A conduit or hose 163 connects the coupling 159 on the test unit with the service coupling 22 on the testing apparatus; and a conduit or hose 164 connects the coupling 160 on the test unit with the rate of climb indicator 137 on the aircraft.

In making the connection from the hose 164 to the aircraft climb indicator 137, the latter is of course first disconnected from its static conduit line (132, Fig. 10) on the aircraft. Inasmuch as tests of the air speed indicator 127 and the altimeter 136 of the aircraft, may be in process at this same time and as described for Figs. 10 and 11, the above described interconnection of the testing apparatus, the testing unit, and the aircraft climb indicator, may be made if preferred as in the following brief description with reference to Fig. 10, and it will be understood by those skilled in this art without further illustration. A hose connection is made from the coupling 22 on the testing apparatus to the static line of the aircraft; the conduit connection from the static line to the rate of climb indicator 137 of the aircraft is disconnected from the indicator and connected by hose to the coupling 159 of the test unit; and the climb indicator 137 itself is then connected by the said hose connection 164 to the coupling 160 of the test unit.

The arrangement of the connections and valves of the testing apparatus for this test are as shown in Fig. 12. When the pump is running, it pumps air in at the valve 11 and out at the valve 8 as described hereinbefore for vacuum tests (Figs. 10 and 11); and when the valve 11 is closed down, vacuum develops in the conduit 81.

At the start of the test, the valve 10 is in the closed position (not the open position shown) and the vacuum is communicated through the conduits 115 and 117, through the valve 2 to the conduits 110 and 111, and thence (by conduit 110) to the manifold vacuum relief valve 28, and (by conduit 111) through valve 1 to conduit 113 and to the manifold pressure master instrument 13. The valve 11 is now manipulated until the vacuum indicated on the instrument 13 is approximately that represented by 15 inches of mercury whereby a suitable maximum vacuum to make the test is established.

The valve 10 is now opened to the position shown, communicating this vacuum to the conduits 144 and 145. These conduits both being subjected to vacuum, the altimeter master instrument 17 may indicate, although this is incidental, and the air speed master instrument 14 is subjected to vacuum at one side, through conduit 146, but this is neutralized by the connection from the other side of the instrument 14 through the conduits 147 and 148 and through the valve 3 and by conduit 152 to the first named side of the instrument; so that the air speed master instrument is protected, and does not indicate.

The vacuum in the conduit 145 is communicated through the service coupling 22 and hose or conduit 163 to the conduit 158 of the test unit, and thence to the master climb instrument 156 of the test unit, and to the aircraft climb indicator 137. The valve 157 on the test unit is at this time wide open, so that both the climb instrument and the climb indicator are now indicating zero.

The operator now begins to close the valve 157 and positions are reached at which the instrument and indicator both indicate higher and higher "up" readings; and the readings on the aircraft climb indicator 137 may be compared with the readings on the master climb instrument 156. Due to the characteristics of these instruments, if the operator stops closing the valve 157 their indicating pointers eventually come back to zero. If he now opens the valve 157 positions are reached at which the instruments will indicate higher and higher readings in the "down" direction, and their "down" readings may be compared.

Associated with the valves 3, 7, and 10, are, respectively, adjustable restrictions 165, 166, and 167. A like adjustable restriction 118 has already been referred to in association with the valve 8. These restrictions are provided to limit the rate at which pressure or vacuum as the case may change at the master instruments and at the corresponding instruments being tested, so as to prevent damage to the instruments which might result from careless or improper operation of the testing apparatus. Therefore, while I have, hereinbefore, described the means for adjustably varying the amounts of pressure or vacuum communicated to the master instruments and tested apparatus, these adjustable restrictions adjustably predetermine a maximum rate at which the pressure or vacuum can change while attaining the said amounts.

*Volumetric air flow, pressure or vacuum*

From the foregoing it is believed to be apparent that the apparatus of Fig. 1 when set to deliver air pressure, for example as in Fig. 7 at the coupling 20, or in Fig. 8 at the coupling 19, may deliver air under adjustable pressure to an apparatus or instrument to test it when a continuous flow of air to or through the tested apparatus is required. Also, Fig. 12 illustrates a use of the apparatus to draw air continuously, from or through an apparatus to be tested at adjustable sub-atmospheric pressure or vacuum. It is believed to be unnecessary therefore to further illustrate or describe the apparatus of Fig. 1 when used for making volumetric air flow tests under pressure or vacuum.

It will also occur to those skilled in the art, after a reading of the foregoing illustrative tests, how to make a great number of other tests utilizing oil pressure, volumetric oil flow, air pressure, vacuum, volumetric air flow under pressure or vacuum, and (by utilizing more than one of the service couplings at the same time) combinations of these types of tests.

The testing apparatus of Fig. 1, is as stated preferably designed so that all of the apparatus may be built into a box-like vacuum and pressure unit of which the panel 12 is the cover. The complete apparatus for making tests on all aircraft instruments and apparatus includes other testing units besides this vacuum-pressure unit, for example: a tachometer testing unit, a gyro instrument testing unit, a temperature indicator testing unit, etc.; and it has been found to be practical and convenient, as well as desirable by aircraft servicing personnel, to provide a wheeled carrier for housing and transporting all of these testing units to the vicinity of an aircraft on which tests are to be made.

The vacuum-pressure testing unit of the present invention being of considerable weight, is in practice, preferably built so that the service couplings 18 to 23 inclusive, Fig. 1, located at the side thereof, are accessible for making conduit hose connections thereto without having to remove the unit from the carrier. This includes the field testing of automatic pilot complete systems in the aircraft as in Fig. 6 where service couplings 18 and 23 are utilized. The coupling 24 on the reservoir 40, however, being under the panel 12 is inaccessible from the side of the unit. It is used as in Fig. 5, when components of the automatic pilot are to be tested, and such a test is usually a bench test. Before this coupling can be used, the testing unit must be lifted out of the carrier, to give access to the coupling. This insures that this coupling will not be inadvertently used when the test of Fig. 6, on the complete automatic pilot system is to be made.

In the foregoing, the development of oil pressure, and air pressure, and vacuum, selectively, by the testing apparatus, is described as effected by the setting of a selector valve, and then throttling a by-pass across the pump. A simplified analysis of this underlying principle of the invention will now be given in connection with Figs. 13, 14, and 15.

When the selector valve 4 is in the selected position of Fig. 13, it causes the pump 32 to pump oil from an oil supply line A, and cuts off an air supply line B; and when the valve 4 is in the position of Fig. 14 or Fig. 15 it causes the pump to pump air from the air supply line B and cuts off the oil supply line A.

In Fig. 13, oil is pumped from the oil reservoir 40, through the oil supply line A through the valve 4, to the pump intake conduit 37, through the pump 32, to the output conduit 38, through valve 5 and back into the reservoir 40. The valve 5 is thus in a by-pass across the pump. By throttling this by-pass at the valve 5, oil pressure is developed at the output side of the pump to test the apparatus C.

In Figs. 14 and 15 air is pumped from the atmosphere as a reservoir and indicated at D, through the valve 11, through the air supply conduit B through valve 4, to pump inlet conduit 37, through the pump 32, to output conduit 38, through valve 8, back to atmosphere D. The valves 8 and 11 are thus in series in a by-pass across the pump. By throttling this by-pass at the valve 8, air pressure is developed at the output side of the pump to test the apparatus E, as in Fig. 14. By throttling this same by-pass at the valve 11, vacuum is developed at the intake side of the pump to test the apparatus F as in Fig. 15.

While the underlying principles of my invention are preferably embodied in the system described above and illustrated in simplified form in Figs. 13 to 15, they may be embodied in other systems, of which that shown in Figs. 16 and 17 in simplified form is illustrative, of which a brief description will now be sufficient, in view of the foregoing.

When the selector valve 4 is in the selected position of Fig. 16, it causes the pump 32 to pump oil from an oil supply line G, and cuts off an air supply line H; and when the valve 4 is in the position of Fig. 17, it causes the pump 32 to pump air from an air supply line H and cuts off the oil supply line G. The oil line G is connected to oil in a reservoir 40 and the air line H communicates with the atmosphere above the oil. The pump output line I is both an air line and an oil line, and connects the pump outlet to the atmosphere above the oil in the reservoir 40. The pump input line J from the valve 4 to the pump inlet is also an oil and air line.

Throttle valves 11 and 5 are provided, in the lines J and I respectively.

The line I, valve 5, line G (or line H) and line J constitute by-passes across the pump.

With the pump pumping oil as in Fig. 16, it flows from the reservoir 40, through oil supply line G, through the valve 4, valve 11, air-oil line J, pump 32, air-oil line I and valve 5 to the atmosphere above the oil in the reservoir; and when the pump is pumping air as in Fig. 17 the air flows over the same path except that it flows in the air supply line H instead of the oil supply line G.

When air is being pumped (Fig. 17), the valve 5 may be operated to throttle the air flow to develop air pressure in the line I on the output side of the pump, for testing an apparatus K; or the air flow may be throttled at the valve 11 to develop vacuum in the line J on the intake side of the pump for testing an apparatus L.

When oil is being pumped (Fig. 16) the oil flow may be throttled at the valve 5 to develop oil pressure in the line I on the pump output side to test an apparatus M; or the oil flow may be throttled at the valve 11 on the pump intake side to develop oil suction for testing an apparatus N.

My invention is not limited to the particular tests illustrated and described above, nor to the settings of the valves, adjustments, and controls illustrated and described for these particular tests. Nor is my invention limited to exactly the parts, arrangement of the valves, service couplings, system of conduit connections, etc., illustrated and described for Fig. 1. Changes and modifications may be made by those skilled in this art without departing from the spirit of my invention, as is exemplified by the modification of Figs. 16 and 17, and my invention is therefore comprehensive of all such modifications and changes which come within the scope of the appended claims.

I claim:

1. A testing apparatus for selectively delivering adjustably variable oil pressure, air pressure and vacuum to apparatus to be tested, comprising: a pump; intake and output conduits connected to the pump; an oil supply conduit and an atmospheric-air supply conduit; an oil containing reservoir; said oil supply conduit being in communication with said reservoir; a fluid selector valve for connecting the pump intake conduit to the oil supply conduit and to the atmospheric-air supply conduit selectively to cause the pump to supply oil and air selectively to the output conduit; conduit means providing an oil by-pass from the pump output conduit to the oil reservoir, and an air by-pass from the pump output conduit to the air supply conduit through the atmosphere; connections for apparatus to be tested by oil pressure and air pressure for connecting said apparatus to the pump output conduit; connections for apparatus to be tested by air vacuum for connecting said apparatus to the air supply conduit; and selectively operable throttle valve means for variably throttling the oil by-pass, and the air by-pass at the pump output conduit side and at the air supply conduit side of the atmosphere.

2. A testing apparatus for selectively delivering adjustably variable oil pressure, air pressure and vacuum to apparatus to be tested, comprising: a pump; intake and output conduits connected to the pump; an oil supply conduit and an atmospheric-air supply conduit; an oil containing reservoir; said oil supply conduit being in communication with said reservoir; a fluid selector valve having a position in which it connects the oil supply conduit to the pump intake conduit and blocks off the air supply conduit, and a position in which it connects the air supply conduit to the pump intake conduit and blocks off the oil supply conduit; to cause the pump to supply oil and air selectively to the output conduit; conduit means providing an oil by-pass from the pump output conduit to the oil reservoir, and an air by-pass from the pump output conduit to the air supply conduit through the atmosphere; connections for apparatus to be tested by oil pressure and air pressure for connecting said apparatus to the pump output conduit; connections for apparatus to be tested by air vacuum for connecting said apparatus to the air supply conduit; a first adjustable throttle valve in the oil by-pass, a second adjustable throttle valve in the air by-pass between the atmosphere and the pump output conduit, and a third adjustable throttle valve adjacent the entrance of the air supply conduit.

3. A testing apparatus for selectively delivering adjustably variable oil pressure and air pressure to apparatus to be tested comprising: a pump; intake and output conduits connected to the pump; an oil supply conduit and an atmospheric-air supply conduit; an oil containing reservoir; said oil supply conduit being in communication with said reservoir; a fluid selector valve for connecting the oil supply conduit to the pump intake conduit and concurrently blocking off the air supply conduit, and for connecting the air supply conduit to the pump intake conduit and concurrently blocking off the oil supply conduit; to cause the pump to supply oil and air selectively to the output conduit; conduit means providing an oil by-pass from the pump output conduit to the oil reservoir, and an air by-pass from the pump output conduit to the air supply conduit through the atmosphere; conduit connections for apparatus to be tested by oil pressure and air pressure for connecting the apparatus to the pump output conduit; an adjustable throttle valve in the oil by-pass, and an adjustable throttle valve in the air by-pass between the atmosphere and the pump output conduit.

4. A testing apparatus for selectively delivering adjustably variable air pressure and vacuum to apparatus to be tested comprising: a pump; intake and output conduits connected to the pump; an atmospheric-air supply conduit connected to the intake conduit; conduit means providing a by-pass from the pump output conduit to the air supply conduit through the atmosphere; conduit connections for apparatus to be tested by air pressure for connecting the apparatus to the pump output conduit; conduit connections for apparatus to be tested by vacuum for connecting said apparatus to the air supply conduit; an adjustable throttle valve in the by-pass between the atmosphere and the pump output conduit and an adjustable throttle valve adjacent the entrance of the air supply conduit.

5. A testing apparatus for selectively delivering adjustably variable oil pressure, air pressure and vacuum to apparatus to be tested, comprising: a pump; intake and output conduits connected to the pump; an oil supply conduit and an atmospheric-air supply conduit; an oil containing reservoir; said oil supply conduit being in communication with said reservoir; a fluid selector valve having a position in which it connects the oil supply conduit to the pump intake conduit and blocks off the air supply conduit, and a position in which it connects the air supply conduit to the pump intake conduit and blocks off the oil supply conduit, to cause the pump to supply oil and air selectively to the output conduit; conduit means providing an oil by-pass from the pump output conduit to the oil reservoir, and an air by-pass from the pump output conduit to the air supply conduit through the atmosphere; a first adjustable throttle valve in the oil by-pass, a second adjustable throttle valve in the air by-pass between the atmosphere and the pump output conduit, and a third adjustable throttle valve adjacent the entrance of the air supply conduit; oil conduit means for connecting apparatus to be tested to the pump output conduit for subjecting it to variable oil pressure in response to adjustments of the first throttle valve; air pressure conduit means for connecting indicating apparatus to the pump output conduit, and air vacuum conduit means for connecting indicating apparatus to the air supply conduit, for subjecting the indicating apparatuses to pressure and vacuum, respectively, in response to adjustments of the second and third throttle valves, respectively; and adjustable restriction means in the line of the air pressure conduit means and air vacuum conduit means, respectively, to control the rate of change of the pressure and vacuum to which the indicating apparatuses are subjected responsive to changes of adjustment of the corresponding throttle valves.

6. A testing apparatus for selectively delivering adjustably variable oil pressure and air pressure to apparatus to be tested comprising: a pump; intake and output conduits connected to the pump; an oil supply conduit and an atmospheric air supply conduit; an oil-containing reservoir, said oil supply conduit being in communication with said reservoir; a fluid selector valve for connecting the oil supply conduit to the pump intake conduit and concurrently blocking off the air supply conduit, and for connecting the air supply conduit to the pump intake conduit and concurrently blocking off the oil supply conduit; to cause the pump to supply oil and air selectively to the output conduit; conduit means providing an oil by-pass from the pump output conduit to the oil reservoir, and an air by-pass from the pump output conduit to the air supply conduit through the atmosphere; an adjustable throttle valve in the oil by-pass, and an adjustable throttle valve in the air by-pass between the atmosphere and the pump output conduit; oil conduit means for connecting apparatus to be tested by oil pressure to the pump output conduit, and air conduit means for connecting indicating apparatus to the pump output conduit to subject the same to oil pressure and air pressure, respectively, in response to adjustments of the throttle valves, respectively; and adjustable restriction means in the line of the air conduit means to control the rate of change of the air pressure to which the indicating apparatus is subjected responsive to adjustment of the throttle valve in the air by-pass.

7. A testing apparatus for selectively delivering adjustably variable air pressure and vacuum to apparatus to be tested comprising: a pump; intake and output conduits connected to the pump; an atmospheric air supply conduit connected to the intake conduit; conduit means providing a by-pass from the pump output conduit to the air supply conduit through the atmosphere; an adjustable throttle valve in the by-pass between the atmosphere and the pump output conduit and an adjustable throttle valve adjacent the entrance of the air supply conduit; air pressure conduit means for connecting indicating apparatus to the pump output conduit, and air vacuum conduit means for connecting indicating apparatus to the air supply conduit, for subjecting the apparatuses to pressure and vacuum, respectively, in response to adjustments of the throttle valves, respectively; and adjustable restriction means in the line of the air pressure conduit means and air vacuum conduit means respectively to control the rate of change of the pressure and vacuum to which the apparatuses are subjected responsive to adjustments of the throttle valves.

8. In an apparatus of the class described, a pump adapted to pump oil or air and having an inlet and an outlet; an oil reservoir; an air-oil separator communicating with the reservoir; an air-oil conduit connecting the pump outlet and separator; an oil conduit between the oil reservoir and the pump inlet; an air outlet conduit from the separator to atmosphere; a first throttle valve controlling the air-oil conduit; a second throttle valve controlling the air outlet conduit; a selector valve controlling the oil conduit and having a branch conduit connection; and an air inlet conduit connected to the said branch conduit connection and communicating with the atmosphere; a third throttle valve controlling the air-inlet conduit; the selector valve having a position in which it cuts off the oil conduit connection from the reservoir to the pump inlet and makes conduit connection from the air inlet conduit to the pump inlet; and having another position in which it cuts off the air inlet conduit and makes connection through the oil conduit from the reservoir to the pump inlet.

9. In an apparatus of the class described, a pump adapted to pump air or oil and having an inlet and an outlet; an oil reservoir containing oil and having an air chamber above the oil; an air-oil conduit connecting the pump outlet to the chamber; an oil conduit between the oil reservoir and the pump inlet; an air outlet conduit from the chamber to atmosphere; a first throttle valve controlling the air-oil conduit; a second throttle valve controlling the air outlet conduit; a selector valve controlling the oil conduit and having a branch conduit connection; and an air-inlet conduit connected to the said branch conduit connection and communicating with the atmosphere; a third throttle valve controlling the air-inlet conduit; the selector valve having a position in which it cuts off the oil conduit connection from the reservoir to the pump inlet and makes conduit connection from the air-inlet conduit to the pump inlet; and having another position in which it cuts off the air inlet conduit and makes connection through the oil conduit from the reservoir to the pump inlet.

10. In an apparatus of the class described, a pump adapted to pump air or oil and having an inlet and an outlet; an oil reservoir containing oil and having an air chamber above the oil; an air-oil conduit connecting the pump outlet to the chamber; an oil conduit between the oil reservoir and the pump inlet; an air outlet conduit from the chamber to atmosphere; a first throttle valve controlling the air-oil conduit; a second throttle valve controlling the air outlet conduit; a selector valve controlling the oil conduit and having a branch conduit connection; and an air-inlet conduit connected to the said branch conduit connection and communicating with the atmosphere; a third throttle valve controlling the air-inlet conduit; the selector valve having a position in which it cuts off the oil conduit connection from the reservoir to the pump inlet and makes conduit connection from the air-inlet conduit to the pump inlet; and having another position in which it cuts off the air inlet conduit and makes connection through the oil conduit from the reservoir to the pump inlet; conduit means connected to the air-oil conduit between the first throttle valve and the pump outlet for supplying oil pressure to apparatus to be tested; conduit means connected to the air-outlet conduit between the chamber and the second throttle valve for supplying air pressure to apparatus to be tested; and conduit means connected to the air inlet conduit between the selector valve and the third throttle valve for supplying vacuum to apparatus to be tested.

11. In an apparatus of the class described, a pump adapted to pump air or oil and having an inlet and an outlet; an oil reservoir containing oil and having an air chamber above the oil; an air-oil conduit connecting the pump outlet to the chamber; an oil conduit between the oil reservoir and the pump inlet; an air outlet conduit from the chamber to atmosphere; a first throttle valve controlling the air-oil conduit; a second throttle valve controlling the air outlet conduit; a selector valve controlling the oil conduit and having a branch conduit connection; and an air-inlet conduit connected to the said branch conduit connection and communicating with the atmosphere; a third throttle valve controlling the air-inlet conduit; the selector valve having a position in which it cuts off the oil conduit connection from the reservoir to the pump inlet and makes conduit connection from the air-inlet conduit to the pump inlet; and having another position in which it cuts off the air inlet conduit and makes connection through the oil conduit from the reservoir to the pump inlet; a pump oil-metering conduit path communicating from the reservoir to the air-inlet branch connection of the selector valve; and means controlling the rate of oil flow through the oil metering conduit.

12. A testing unit for testing oil operated pressure gages or the like comprising in a unitary portable structure: a conduit having a first coupling at one portion thereof for making conduit connection to a source of oil under pressure, and having a second coupling at another portion for making connection to the gage or the like to be tested; a throttle valve for throttling the conduit; a two way valve between the throttle valve and the first coupling; a pressure indicating master instrument communicating with the conduit between the throttle valve and the second coupling; a vented oil receptacle communicating with the conduit under control of the two way valve; the two way valve in one position blocking off flow through the conduit from the first coupling and connecting the receptacle to the conduit; and in another position blocking off the receptacle from the conduit and removing the said block from the first coupling.

13. In a testing apparatus, a pump having an intake conduit and an output conduit; each communicating with the atmosphere and each having an adjustable throttle valve between the atmosphere and the pump, whereby adjustment of one valve develops variable pressure in the output conduit, and adjustment of the other valve develops variable vacuum in the input conduit; a pressure supply conduit and a vacuum supply conduit communicating with the output and input conduits respectively; a pressure and vacuum indicating instrument; a pressure relief valve and a vacuum relief valve; a pressure and vacuum service outlet to which connections to apparatus to be tested may be made; conduit means and a two position control valve therefor which in one position connects the instrument, the pressure relief valve and the service outlet to the pressure supply conduit, and in another position connects the instrument, the vacuum relief valve and the service outlet to the vacuum supply line.

14. In a testing apparatus for aircraft instruments and the like; a pump having an input conduit communicating with an air supply conduit and with an oil supply conduit; an oil containing reservoir; said oil supply conduit being in communication with said reservoir; positionable selector means to connect the pump to said conduits selectively to cause the pump to pump, selectively, air and oil; means to supply oil to the pump at a metered rate when pumping air; a pump output conduit for conducting air and oil respectively from the pump; a float valve in the line of the output conduit operable to close it if the pump due to any cause should pump oil at an excessive rate when the selector means is positioned for air pumping; operable valve means to operably increase or decrease the air flow in the output conduit; and adjustable air flow restricting means for limiting to a predetermined maximum the rate of increase of air flow at the float valve, upon operation of the operable valve means to increase the air flow in the output conduit, to prevent operation of the float valve by the increased air flow.

15. In a testing apparatus for air pressure and vacuum operated aircraft instruments and the like, a pump having an output conduit and an input conduit, each in communication with the atmosphere and each having an operable throttle valve between the atmosphere and the pump for developing operably variable pressure in the pump output conduit and operably variable vacuum in the pump input conduit, in accordance with the rate of flow of air out of the output conduit and into the input conduit respectively, determined by operation of the throttle valves, respectively; air pressure operated and vacuum operated instruments and valve means for connecting them to the output and input conduits, respectively; and adjustable air flow restricting means for limiting to predetermined maxima, the rates of change of pressure and vacuum, at the instruments occasioned by operation of the throttle valves.

16. In a testing apparatus for testing the airspeed indicator and altimeter of an aircraft; a master air-speed instrument and a master altimeter; a source of adjustably variably vacuum; a pair of service couplings adapted to be conduit-connected respectively to the Pitot and static conduit lines of the aircraft Pitot-static head; conduit means connecting the source of vacuum to the master altimeter; to the static side of the master air-speed instrument, and to the static-connected service coupling; a two position valve and conduit means controlled thereby which, in one position of the valve, connects the Pitot side of the master air-speed instrument and the Pitot-connected service coupling to atmosphere; and which in another position of the valve, connects the static and Pitot sides of the master air-speed instrument to each other and to Pitot-connected service coupling.

17. A testing apparatus for testing aircraft instruments and the like comprising; an oil reservoir; a pump adapted to pump oil or air; a conduit system comprising an oil intake conduit connected to the pump inlet and to the reservoir; an oil supply conduit connected to the pump outlet and returning oil to the reservoir; an air intake conduit connected to the pump inlet and open to the atmosphere; an air supply conduit connected to the pump outlet and open to the atmosphere; selector valve means controlling the system to cause the pump to pump, selectively, oil from and back to the reservoir, and air from and back to the atmosphere; selectively operable throttle valve means to adjustably throttle the oil supply output conduit to develop adjustably variable oil pressure therein; and to throttle the air supply conduit to develop adjustably variable air pressure therein; and to throttle the air intake conduit to develop adjustably variable vacuum therein; and service conduit couplings associated with the oil supply conduit, the air supply conduit, and air intake conduit, respectively, to supply, selectively, oil pressure, air pressure, and air vacuum to apparatus to be tested.

18. A testing apparatus for testing two indicating instruments on an aircraft of a type that is operated by a differential of pressure on its two sides; the testing apparatus comprising a pair of master instruments of the same type as those on the aircraft to be tested; a pair of service couplings to which the aircraft instruments may be conduit-connected; an air conduit system, interconnecting the master instruments and couplings; an air pump for developing vacuum in the conduit system; control valve means for varying the vacuum; the conduit system comprising a two position valve, and conduit connections controlled thereby by which, for each position of the valve, vacuum in the system is applied to one side of one master instrument and of one coupling-and-conduit-connected indicating instrument; and by which, for one position of the valve, vacuum in the system is applied to one side of the other master instrument and of the other conduit-connected indicating instrument; and by which for the other position of the valve the pressure on the two sides of the said other master instrument and of the said other indicating instrument is equalized.

ERVIN J. OSTERHUS.

REFERENCES CITED

The following references are of record in the file of this patent:

UNITED STATES PATENTS

| Number | Name | Date |
| --- | --- | --- |
| 261,087 | Gaskins | July 11, 1882 |
| 412,830 | Bosworth | Oct. 15, 1889 |
| 1,482,376 | Anderson | Feb. 5, 1924 |
| 1,879,262 | Hubbard | Sept. 27, 1932 |
| 2,310,974 | Lumm | Feb. 16, 1943 |
| 2,332,725 | Jordan | Oct. 26, 1943 |